United States Patent
Yi et al.

(10) Patent No.: US 11,263,455 B2
(45) Date of Patent: Mar. 1, 2022

(54) MOBILE TERMINAL AND METHOD FOR CONTROLLING THE SAME

(71) Applicant: LG ELECTRONICS INC., Seoul (KR)

(72) Inventors: Gijae Yi, Seoul (KR); Myungjin Ha, Seoul (KR); Jongpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/035,175

(22) Filed: Sep. 28, 2020

(65) Prior Publication Data

US 2021/0216768 A1 Jul. 15, 2021

(30) Foreign Application Priority Data

Jan. 14, 2020 (WO) .......................... KR2020/000658

(51) Int. Cl.
| | |
|---|---|
| *G06T 7/50* | (2017.01) |
| *H04N 13/254* | (2018.01) |
| *H04N 13/296* | (2018.01) |
| *G01B 11/22* | (2006.01) |
| *G01J 5/34* | (2006.01) |

(Continued)

(52) U.S. Cl.
CPC .......... *G06K 9/00664* (2013.01); *G01B 11/22* (2013.01); *G01J 5/0025* (2013.01); *G01J 5/34* (2013.01); *G01S 17/08* (2013.01); *G06T 7/50* (2017.01); *H04N 5/2357* (2013.01); *H04N 13/254* (2018.05); *H04N 13/296* (2018.05);

(Continued)

(58) Field of Classification Search
None
See application file for complete search history.

(56) References Cited

U.S. PATENT DOCUMENTS

| | | | |
|---|---|---|---|
| 2014/0152975 A1 | 6/2014 | Ko | |
| 2018/0341835 A1* | 11/2018 | Siminoff | ............... G06F 16/434 |
| 2019/0324351 A1* | 10/2019 | Kim | ........................ G03B 17/55 |

FOREIGN PATENT DOCUMENTS

| | | |
|---|---|---|
| KR | 20140073117 | 6/2014 |
| KR | 101874564 | 7/2018 |

(Continued)

OTHER PUBLICATIONS

PCT International Application No. PCT/KR2020/000658, International Search Report dated Oct. 14, 2020, 10 pages.

*Primary Examiner* — Patricia I Young
(74) *Attorney, Agent, or Firm* — Lee, Hong, Degerman, Kang & Waimey PC

(57) ABSTRACT

A mobile terminal in accordance with one embodiment of the present disclosure include: a flicker sensor configured to recognize a surrounding environment of the mobile terminal; a time of flight (ToF) sensor configured to measure a depth of a subject and a camera configured to capture the subject to generate an image of the subject; and a controller configured to control the camera to recognize the surrounding environment by operating the flicker sensor in response to a user input for operating the camera, to determine a light output time of the ToF sensor in response to the surrounding environment, and to capture the subject while measuring the depth of the subject by operating the ToF sensor in an operation mode corresponding to the light output time. Other embodiments are also available.

10 Claims, 16 Drawing Sheets

(51) Int. Cl.
*G01S 17/08* (2006.01)
*G06K 9/00* (2022.01)
*H04N 5/235* (2006.01)
*G01J 5/00* (2022.01)
*H04N 13/00* (2018.01)

(52) U.S. Cl.
CPC ............... *G06T 2207/10028* (2013.01); *G06T 2207/30201* (2013.01); *H04N 2013/0081* (2013.01)

(56) References Cited

FOREIGN PATENT DOCUMENTS

| | | |
|---|---|---|
| KR | 20190082097 | 7/2019 |
| KR | 20190123669 | 11/2019 |

\* cited by examiner

821

822

823

824

MOBILE TERMINAL AND METHOD FOR CONTROLLING THE SAME

CROSS-REFERENCE TO RELATED APPLICATION

Pursuant to 35 U.S.C. § 119, this application claims the benefit of the earlier filing date and right of priority to International Patent Application No. PCT/KR2020/000658, filed on Jan. 14, 2020, the contents of which are all hereby incorporated by reference herein in its entirety.

BACKGROUND

1. Technical Field

The present disclosure relates to a mobile terminal capable of capturing an image with a camera, and a method for controlling the same.

2. Description of the Related Art

Terminals may be divided into mobile/portable terminals and stationary terminals according to mobility. Also, the mobile terminals may be classified into handheld types and vehicle mount types according to whether or not a user can directly carry.

Functions of mobile terminals have been diversified. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player. In recent years, the performance of the camera built in the terminal has been improved, so that the terminal may provide not only an image of 4K resolution (3840×2160) or 8K resolution (7680×4320), but also may provide a 3D image three-dimensionally displaying the subject in real time.

Meanwhile, in order to generate such a 3D image, a process of measuring a depth of a subject is required, and a time of flight (ToF) sensor may be used to measure a depth of the subject. However, being exposed to light from the ToF sensor (e.g., infrared light) for a long time can be harmful to a human body. In addition, when a light output time from the ToF sensor is too short, the depth of the subject may not be measured clearly.

SUMMARY

An aspect of the present disclosure is to provide a mobile terminal and a method for controlling the same which is capable of efficiently controlling a light output time from a time of a flight (ToF) sensor while measuring a depth of a subject more clearly and not harmful to a human body.

A mobile terminal in accordance with one embodiment of the present disclosure may include: a flicker sensor configured to recognize a surrounding environment of the mobile terminal; a ToF sensor configured to measure a depth of a subject and a camera configured to capture the subject to generate an image of the subject; and a controller configured to control the camera to recognize the surrounding environment by operating the flicker sensor in response to a user input for operating the camera, to determine a light output time of the ToF sensor in response to the surrounding environment, and to capture the subject while measuring the depth of the subject by operating the ToF sensor in an operation mode corresponding to the light output time.

A method for controlling a mobile terminal in accordance with one embodiment of the present disclosure may include: in response to a user input for operating a camera, recognizing a surrounding environment by using a flicker sensor; in response to the surrounding environment, determining a light output time of a ToF sensor measuring a depth of a subject; and capturing the subject while measuring the depth of the subject by operating the ToF sensor in an operation mode corresponding to the light output time.

DETAILED DESCRIPTION OF THE PREFERRED EMBODIMENT

Figure 1:
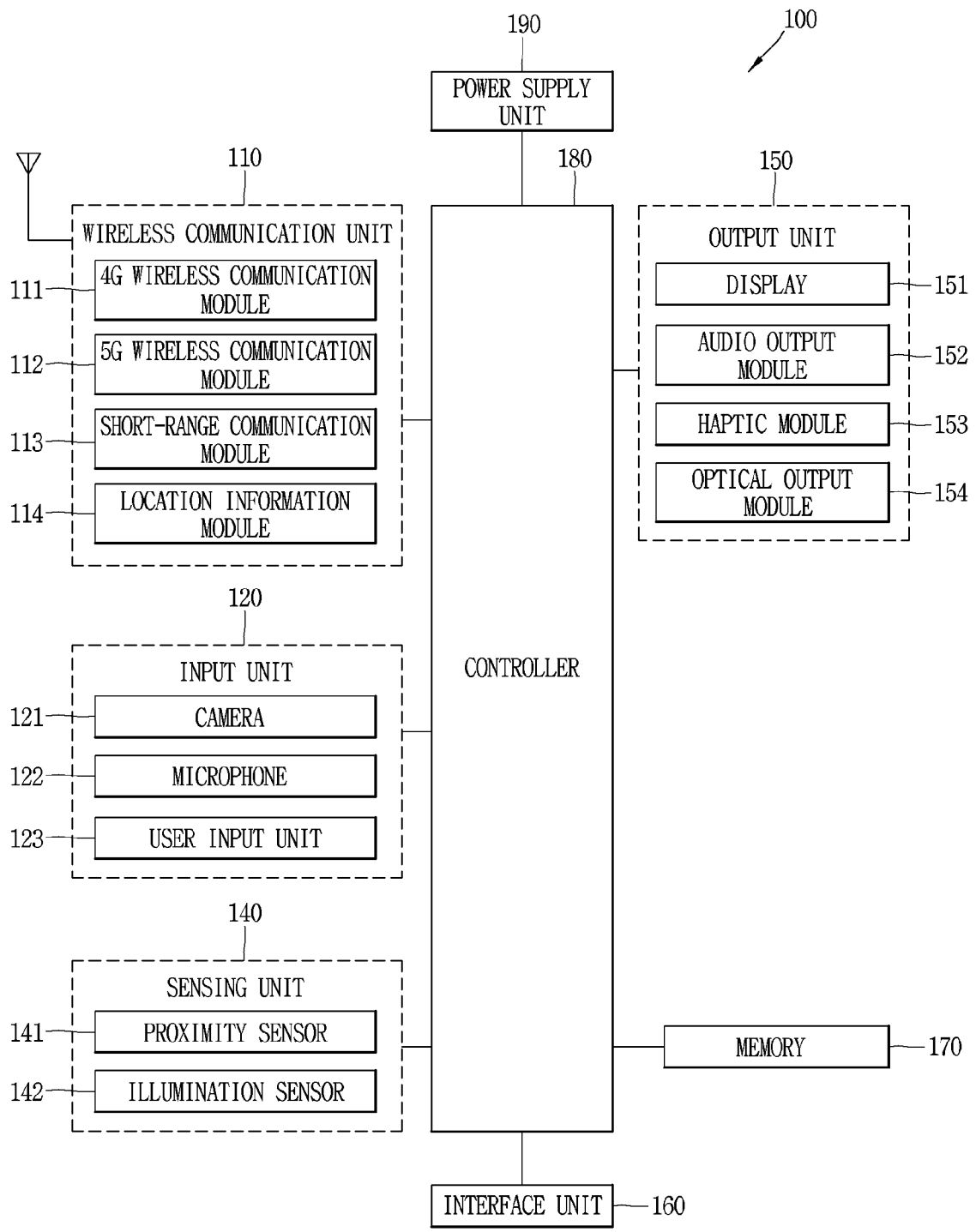
FIG. 1 is a block diagram of a mobile terminal according to various embodiments of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 2A:
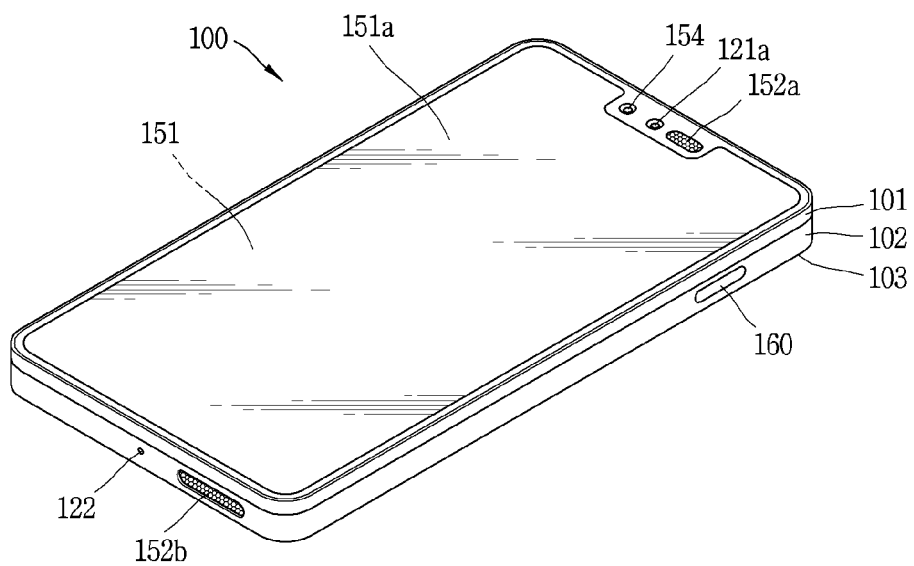
FIGS. 2A and 2B are conceptual views of one example of a mobile terminal according to various embodiments of the present disclosure, which are viewed from different directions.
Figure 2B:
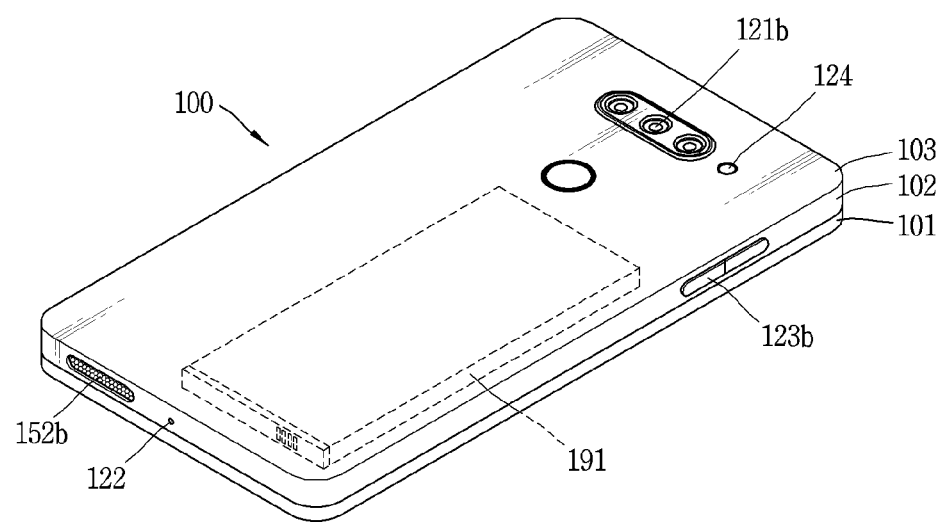

Referring to FIGS. 1, 2A and 2B, FIG. 1 is a block diagram of a mobile terminal according to various embodiments of the present disclosure. FIGS. 2A and 2B are conceptual views of one example of a mobile terminal according to various embodiments of the present disclosure, which are viewed from different directions.

The mobile terminal 100 may include a wireless communication unit 110, an input unit 120, a sensing unit 140, an output unit 150, an interface unit 160, a memory 170, a controller 180, a power supply unit 190, etc. It is understood that implementing all of the components illustrated in FIG. 1 is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include at least one of a broadcast receiver 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may include one or more sensors configured to sense at least one among internal information of the mobile terminal 100, surrounding environment information of the mobile terminal 100, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, a red, green, and blue (RGB) sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal 100 disclosed herein may be configured to utilize information obtained from two or more sensors among these sensors, and combinations thereof.

According to one embodiment, the sensing unit 140 may be implemented in a form including a time of flight (ToF) sensor or a flicker sensor. The controller 180 may measure a distance between the mobile terminal 100 and the subject or a depth of the subject by measuring a time during which light (e.g., infrared light) is emitted from ToF sensor and reflected on an subject to be returned to the ToF sensor. The controller 180 may recognize the surrounding environment of the mobile terminal using the flicker sensor receiving the light around the mobile terminal 100.

The output unit 150 may typically be configured to output various types of information, such as audio, video, tactile output, and the like. The output unit 150 may include at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is implemented to store data to support various functions or features of the mobile terminal 100. For instance, the memory 170 may be configured to store application programs or applications executed in the mobile terminal 100, data or instructions for operations of the mobile terminal 100, and the like. At least one of these application programs may be downloaded from an external server via wireless communication. Other application programs may be installed within the mobile terminal 100 at time of manufacturing or shipping, which is the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 may control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1 to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may cooperatively operate to implement an operation, a control or a control method of the mobile terminal 100 according to various embodiments disclosed herein. Also, the operation, the control or the control method of the mobile terminal 100 may be implemented on the mobile terminal 100 by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiver 111 is configured to receive a broadcast signal and/or broadcast associated information from an external broadcast managing server via a broadcast channel. The broadcast channel may include a satellite channel or a terrestrial channel. In some embodiments, two or more broadcast receivers may be included in the mobile terminal 100 to facilitate simultaneous reception of two or more broadcast channels, or to support switching among broadcast channels.

The mobile communication module 112 may transmit and/or receive radio signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device connected to the mobile terminal 100. Also, when a message is received in the mobile terminal 100, the user can check the received message using the wearable device connected to the mobile terminal 100.

The location information module 115 is generally configured to acquire a position (or current position) of the mobile terminal 100. As an example, the location information module 115 includes a Global Positioning System (GPS) module or a Wireless Fidelity (WiFi) module. For example, when the mobile terminal 100 uses a GPS module, a position of the mobile terminal 100 may be acquired using a signal sent from a GPS satellite. As another example, when the mobile terminal 100 uses the Wi-Fi module, a position of the mobile terminal 100 may be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal 100. The location information module 115 is a module used for acquiring the position (or the current position) of the mobile terminal 100, and may not be limited to a module for directly calculating or acquiring the position of the mobile terminal 100.

Next, the input unit 120 is for inputting image information (or signal), audio information (or signal), data, or information input from a user. For inputting image information, the mobile terminal 100 may be provided with a plurality of cameras 121. Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be inputted to the mobile terminal 100. Also, the cameras 121 may be located in a stereoscopic arrangement to acquire left and right images for implementing a stereoscopic image.

The microphone 122 may process an external audio signal into electric audio (sound) data. The processed audio data can be processed in various manners according to a function executed in the mobile terminal 100. The microphone 122 may include assorted noise removing algorithms to remove unwanted noise generated in the course of receiving the external audio signal.

The user input unit 123 is a component that receives an input of information from a user. Such user input may enable the controller 180 to control operation of the mobile terminal 100 in correspondence with the received information. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal 100, surrounding environment information of the mobile terminal 100, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object existing near a surface, by using an electromagnetic field, infrared light, or the like without a mechanical contact. The proximity sensor 141 may be arranged at an inner region of the mobile terminal 100 covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the controller 180 may process data corresponding to proximity touches and proximity touch patterns sensed by the proximity sensor 141, and cause visual information corresponding to the processed data to be output on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, may include at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs, TR) at rows and columns to scan content received at the photo sensor by using an electrical signal which changes according to a quantity of light applied to the photo diodes. Namely, the photo sensor may calculate the coordinates of the physical object according to variation of light to thus obtain location information of the physical object.

The display 151 may display (or output) information processed in the mobile terminal 100. For example, the display 151 may display execution screen information of an application program executing at the mobile terminal 100 or user interface (UI) or graphic user interface (GUI) information in response to the execution screen information.

Also, the display 151 may be implemented as a stereoscopic display for displaying stereoscopic images.

Atypical stereoscopic display may employ a stereoscopic display scheme such as a stereoscopic scheme (a glass scheme), an auto-stereoscopic scheme (glassless scheme), a protrusion scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 may be controlled by user selection or setting by the controller 180. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source of the mobile terminal 100. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal 100 emits monochromatic light or light with a plurality of colors to a front or rear surface. The signal output may be terminated as the mobile terminal 100 senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle the interface unit 160 can serve as a passage to allow power from the external cradle to be supplied to the mobile terminal 100 or may serve as a passage to allow various command signals input by the user from the external cradle to be transferred to the mobile terminal 100 therethrough. Various command signals or power input from the external cradle may operate as signals for recognizing that the mobile terminal 100 is properly mounted on the external cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage media including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal 100 meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may receive external power or internal power and supply appropriate power required for operating respective elements and components under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 2A and 2B, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two or more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 may include a case (for example, frame, housing, cover, and the like) forming an appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display 151 is located on a front side of the terminal body to output information. As illustrated in FIG. 2A, a window 151a of the display 151 may be mounted in the front case 101 to form a front surface of the terminal body together with the front case 101.

In some embodiments, electronic components may also be mounted in the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted in the rear case 102 may be exposed to the outside.

As illustrated in FIG. 2A, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, and 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 2A and 2B, description will be given of the exemplary mobile terminal 100 in which the front surface of the terminal body is shown having the display 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may not be located on the front surface of the terminal body, and the second audio output module 152b may be located on the side surface of the terminal body other than the rear surface of the terminal body.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

The display 151 may include at least one of a liquid crystal display (LCD), a thin film transistor-LCD (TFT LCD), an organic light-emitting diode (OLED), a flexible display, a three-dimensional (3D) display and an e-ink display.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display 151. For example, the touch sensor may be disposed on a substrate of the display 151, or may be provided inside the display 151.

In this way, the display 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display 151 may include a sound hole for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method when it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The FIG. 2A is illustrated on the basis that the first manipulation unit 123a is a touch key, but the present disclosure may not be necessarily limited to this. For example, the first manipulation unit 123a may be configured as a push key (mechanical key), or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display 151, or the like. The rear input unit may be implemented into a form allowing a touch input, a push input or a combination thereof.

The rear input unit may be disposed to overlap the display 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display 151 may be implemented to have a larger screen.

On the other hand, the mobile terminal 100 may include a finger scan sensor which scans a user's fingerprint. The controller 180 may use fingerprint information sensed by the finger scan sensor as an authentication means. The finger scan sensor may be installed in the display 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiver 111 (see FIG. 1) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the FIG. 2B of the present disclosure illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display 151 to extend the function of the mobile terminal 100. Another example of the accessory may be a touch pen for assisting or extending a touch input onto a touch screen.

Figure 3:
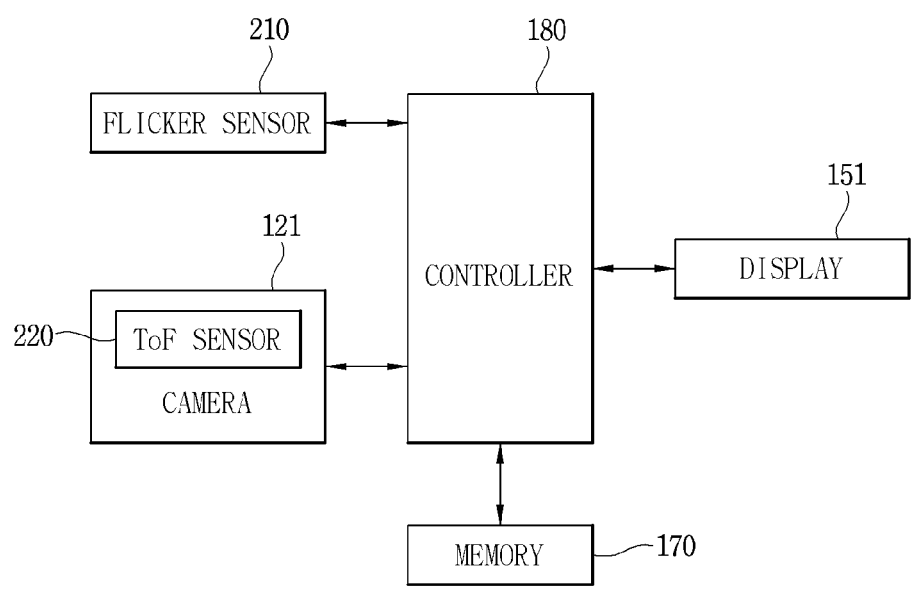
FIG. 3 is a block diagram illustrating a brief configuration of a mobile terminal according to various embodiments of the present disclosure.

Referring to FIG. 3, the mobile terminal 200 may include a camera 121, a display 151, a memory 170, a flicker sensor 210, or a time of flight (ToF) sensor 220. According to an embodiment, the ToF sensor 220 may be implemented in a form included in the camera 121 as illustrated in FIG. 3.

According to various embodiments of the present disclosure, when a user input requesting an operation the camera 121 is received by the mobile terminal 200, the controller 180 may operate the flicker sensor 210. The flicker sensor 210 refers to a sensor that allows light to be outputted while constantly (or non-constantly) blinking by repeating on/off of the light output. The flicker sensor 210 may receive reflected light in which light output through the flicker sensor 210 is reflected by a subject or a surrounding environment. The controller 180 can identify the surrounding environment of the mobile terminal 200 by analyzing a wavelength of the reflected light. For example, the controller 180 may identify brightness or illuminance of the surrounding environment of the mobile terminal 200 by analyzing the wavelength of the reflected light. The controller 180 may determine whether a surrounding environment (e.g., a place where the mobile terminal 200 is located) or a place where a subject to be captured is located indoors or outdoors by using the brightness or illuminance or by using the camera 121. In addition, the flicker sensor 210 may sense a flicker of a place where the mobile terminal 200 is located. A flicker refers to a repetition of light and shade, for example, flickering lights. The flicker sensor 210 may indicate number of times the light blinks as a flicker frequency.

The controller 180 may control the operation of the ToF sensor 220 according to whether the surrounding environment is indoors or outdoors. When the surrounding environment is indoors, the controller 180 may operate the ToF sensor 220 in a normal mode. When the surrounding environment is outdoors, the controller 180 may operate the ToF sensor 220 in one of a full power mode, a safety mode, or a normal mode. In the full power mode, the ToF sensor 220 may output light (e.g., infrared light) for 6000 μs or more, and in the safety mode, the ToF sensor 220 may output light for 0 to 1000 μs, and in the normal mode, the ToF sensor 220 may output light for 1000 to 3000 μs. Here, intensity of light output from the ToF sensor 220 may be constant. That is, an amount of light output from the ToF sensor 220 increases as a time of light output gets longer.

The controller 180 may create an image of a subject (e.g., 3D image, video, etc.) by operating the camera 121 together with the ToF sensor 220 to capture the subject. When an image of the subject is created, the display 151 may display the created image under a control of the controller 180. According to one embodiment, the controller 180 may acquire the depth of the subject by using the ToF sensor 220 and generate a 3D image of the subject by using the acquired depth. In addition, the 3D image may be displayed on the display 151.

According to one embodiment, the controller 180 of the mobile terminal 200 may control the camera 151 or the ToF sensor 220 to continuously capture the subject in real time, and also may control the display 151 to continuously display a 3D image of the subject while the subject is captured by the camera 151 or the ToF sensor 220. Accordingly, the user of the mobile terminal 100 may easily check the 3D image of the subject through a user interface (UI) or user experience (UX) associated with the camera 121 displayed on the display 151 in real time while capturing the subject.

Figure 4A:
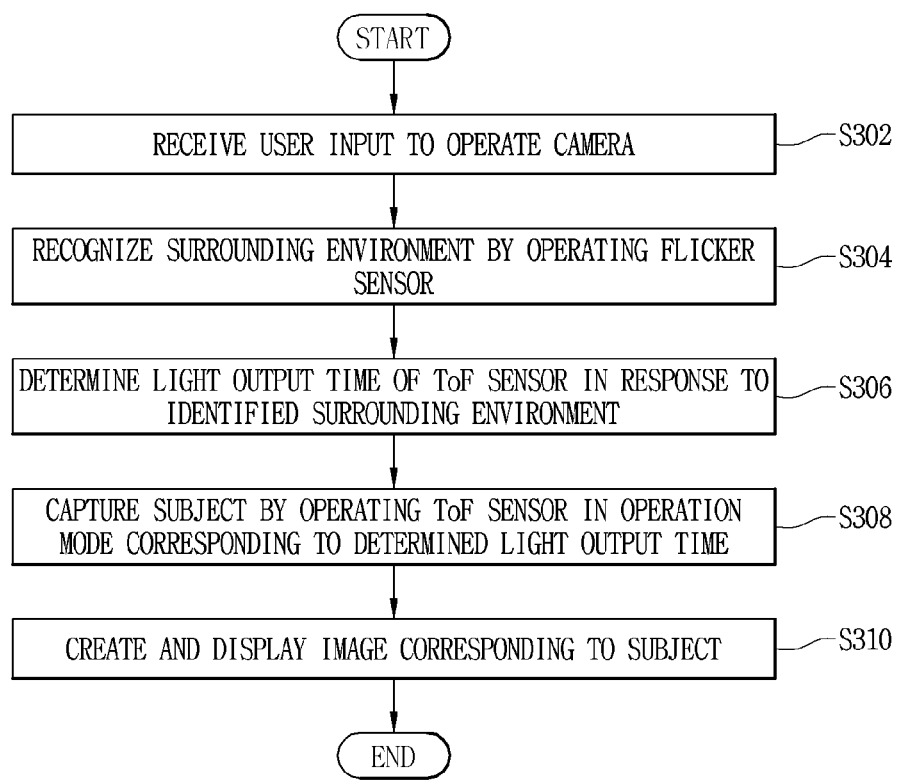
FIG. 4A is a flowchart illustrating a method of operating a mobile terminal according to various embodiments of the present disclosure.

FIG. 4A is a flowchart illustrating a method of operating a mobile terminal according to various embodiments of the present disclosure.

Referring to FIG. 4A, the controller 180 of the mobile terminal 200 may receive a user input to operate the camera 121, for example, a user input to create a 3D image in step S302. The user input to operate the camera 121 may be inputted to the mobile terminal 200 through a UI or UX to operate the camera 121.

Upon receiving the user input, the controller 180 of the mobile terminal 200 may recognize the surrounding environment by using the flicker sensor 210 in step S304. In the step S304, the controller 180 may recognize the surrounding environment by controlling the flicker sensor 210 to output light constantly or non-constantly, and by analyzing the wavelength of the light that is outputted through the flicker sensor 210 then reflected by the surrounding environment. According to one embodiment, the controller 180 may determine an intensity of illumination or brightness of a place where the mobile terminal 200 is located by using the flicker sensor 210.

When the surrounding environment is identified, the controller 180 may determine a light output time of the ToF sensor 220 in response to the identified surrounding environment in step S306. The ToF sensor 220 may operate in a full power mode, a normal mode, or a safety mode according to the light output time.

In step S308, the controller 180 may capture the subject by operating the ToF sensor 220 in an operation mode corresponding to the light output time determined in the step S306. In the step S308, the ToF sensor 220 may operate in one among a full power mode, a normal mode, and a safety mode. In addition, the light output time from the ToF sensor 220 or the intensity of the light output may be adjusted by the controller 180 (in real time). The ToF sensor 220 may be implemented in a form including a vertical cavity surface emitting laser (VCSEL), and the light outputted from the ToF sensor 220 may be an infrared light outputted from the VCSEL. According to one embodiment, when the infrared light outputted from the VCSEL is reflected from the subject, the controller 180 of the mobile terminal 200 may receive the reflected light and measure a distance between the subject and the mobile terminal 200. In particular, the mobile terminal 200 may determine a depth indicating a stereoscopic degree of the subject by measuring a distance between each component constituting the subject (e.g., eyes, a nose, a mouth, etc. of a person) and the mobile terminal 200. In addition, the mobile terminal 200 may control the display 151 to create an image three-dimensionally displaying the subject (e.g., 3D image) based on the determined depth, and to display the created image.

When the subject is captured, the controller 180 may create an image corresponding to the subject, for example, a 3D image, and display the same on the display 151 in step S310.

Figure 4B:
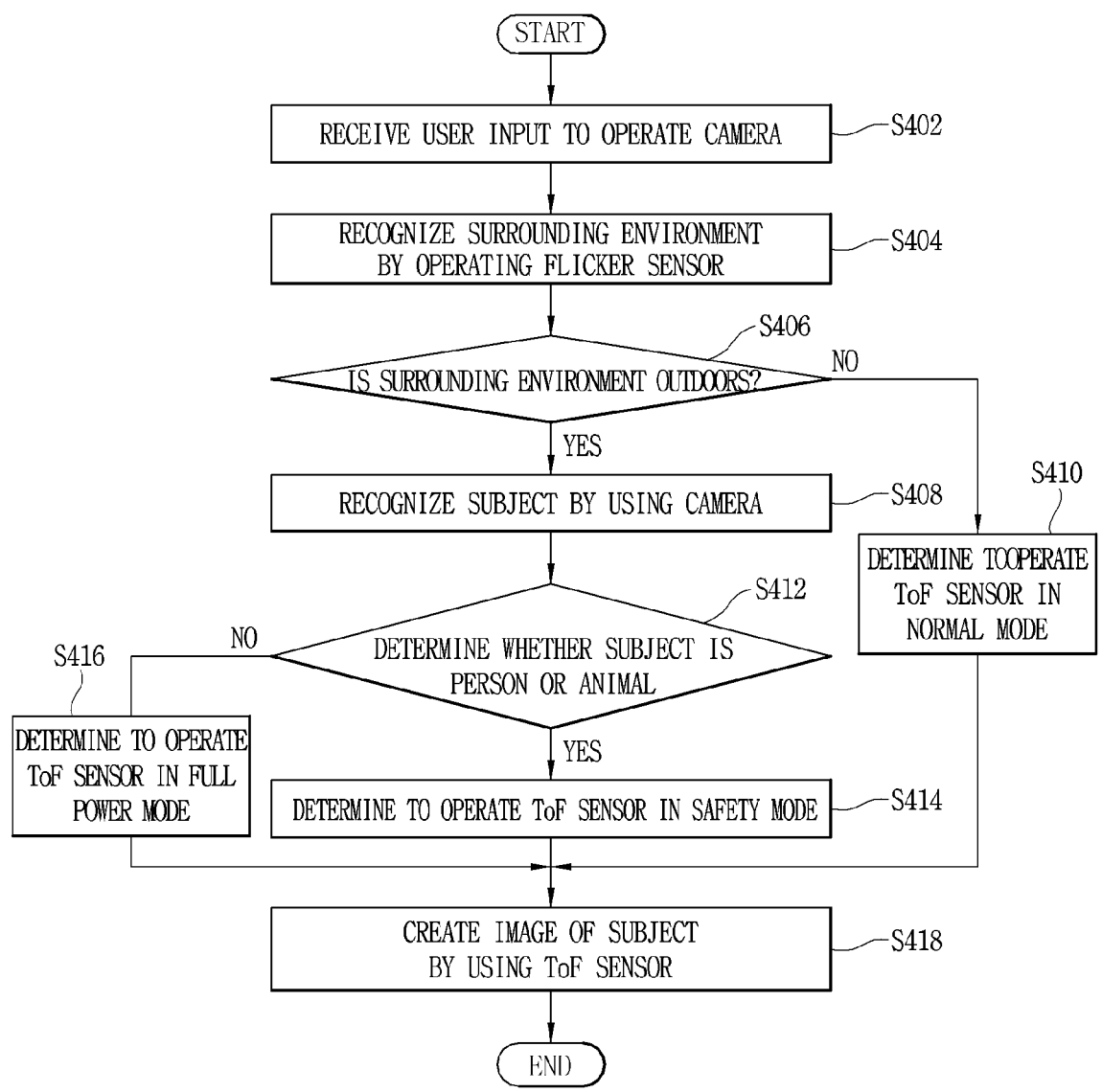
FIG. 4B is a flowchart illustrating a method of operating a mobile terminal according to various embodiments of the present disclosure.

FIG. 4B is a flowchart illustrating a method of operating a mobile terminal according to various embodiments of the present disclosure.

Referring to FIG. 4B, the mobile terminal 200 may receive a user input to operate the camera 121 in step S402. The user input may be inputted to the mobile terminal 200 through a UI or UX to operate the camera 121.

Upon receiving the user input, the controller 180 of the mobile terminal 200 may recognize the surrounding environment by using the flicker sensor 210 in step S404. As mentioned above, the controller 180 may determine the surrounding environment by using the flicker sensor 210 to determine the illuminance or the brightness of the place where the mobile terminal 200 is located.

The controller 180 may use the flicker sensor 210 to determine the surrounding environment, for example, as illustrated in FIGS. 5A to 5D. FIGS. 5A to 5D are views illustrating surrounding environments that can be recognized by a mobile terminal according to various embodiments of the present disclosure. The controller 180 may determine whether the surrounding environment of the mobile terminal 200 is indoors or outdoors based on the illuminance, the brightness or the flicker frequency measured by the flicker sensor 210. For example, assuming that the mobile terminal 200 is located outdoors, as in FIGS. 5A and 5B, the controller 180 may identify that the environment is outdoors by using the illuminance or the brightness measured by the flicker sensor 220. In addition, assuming that the mobile terminal 200 is located indoors, as in FIGS. 5C and 5D, the controller 180 may identify that the environment is indoors by using the illuminance or the brightness measured by the flicker sensor 220.

Figure 5A:
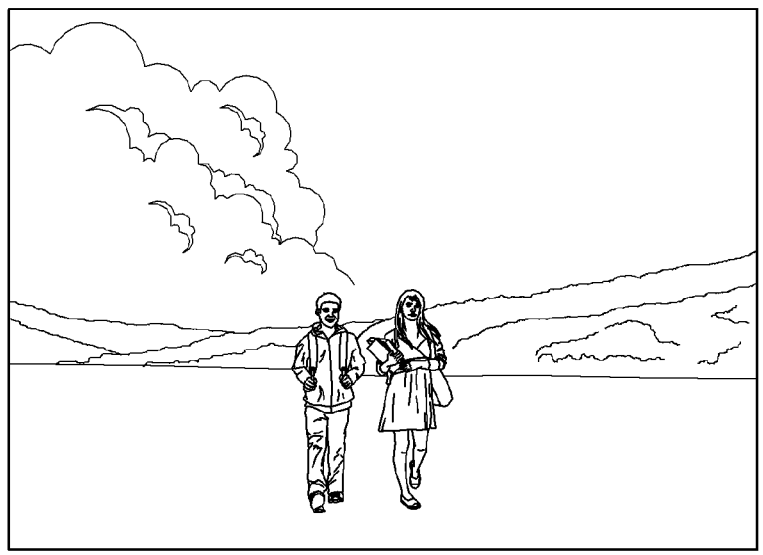
FIGS. 5A to 5D are views illustrating surrounding environments that can be recognized by a mobile terminal according to various embodiments of the present disclosure.
Figure 5B:

For example, it is assumed that the environment is indoors when the illuminance is from LV 1000 to LV 2000, and that the environment is outdoors when the illuminance is from LV 1800 to LV 5000. The illuminance in FIG. 5A may be measured from LV 1800 to LV 3000, and the illuminance in FIG. 5D may be measured from LV 1000 to LV 2000. The controller 180 may determine that FIG. 5A is indoors and FIG. 5D is outdoors based on the illuminance measured by the flicker sensor 220.

Figure 5C:
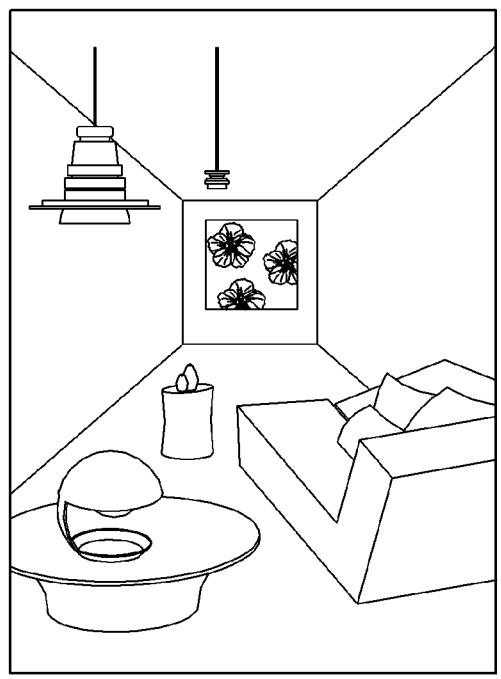
Figure 5D:
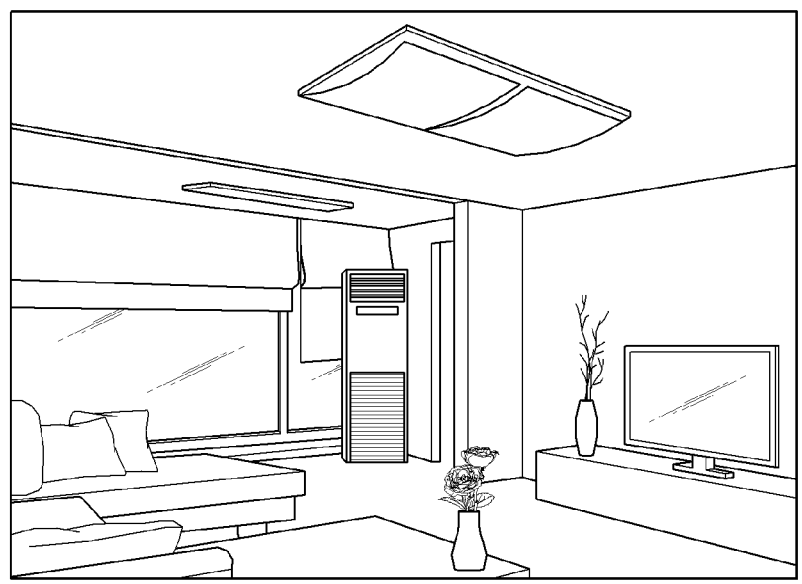

According to one embodiment, when the mobile terminal 200 is located indoors but light enters from the outside as illustrated in FIG. 5C, the controller 180 may determine the environment of FIG. 5C is indoors by using not only the illuminance or brightness but also the flicker frequency of measuring the number of blinks of indoor lighting. For example, when the illuminance measured by the flicker sensor 220 is LV 1900, the controller 180 may determine whether the surrounding environment of the mobile terminal 200 is indoors or outdoors by using the flicker frequency measured by the flicker sensor 220.

As described above, the flicker sensor 210 may measure the flicker frequency of the surrounding environment, and the controller 180 may determine whether the flicker frequency measured by the flicker sensor 210 corresponds to indoors or outdoors. For example, when the flicker frequency measured by the flicker sensor 210 is from 40 to 70 Hz, the controller 180 may determine that the surrounding environment is indoors. When the flicker frequency measured by the flicker sensor 210 is less than 40 Hz, the controller 180 may determine that the surrounding environment is outdoors.

In step S406, the controller 180 may determine whether the surrounding environment is outdoors based on the result of the recognition of the surrounding environment in the step S404. The controller 180 may determine a light output time of the ToF sensor 220 according to the result of the determination in the step S406. The ToF sensor 220 may operate in a normal mode, a safety mode or a full power mode according to the light output time.

When the result of the determination in the step S406 is not outdoors (S406: No), the controller 180 may determine to operate the ToF sensor 220 in the normal mode in step S410. In step S418, the controller 180 may create an image of a subject by using the ToF sensor 220 operating in the normal mode.

When the result of the determination in the step S406 is outdoors (S406: Yes), the controller 180 may recognize a subject by using the camera 121 in step S408. In the step S408, the controller 180 may identify the subject based on the image input through a lens of the camera 121. In step S412, the controller 180 may determine whether the subject is a person or an animal. When the subject is determined as a person or an animal in the step S412 (S412: Yes), the controller 180 may determine to operate the ToF sensor 220 in a safety mode in step S414. In the step S418, the controller 180 may create an image of the subject by using the ToF sensor 220 operating in the safety mode.

Figure 6A:
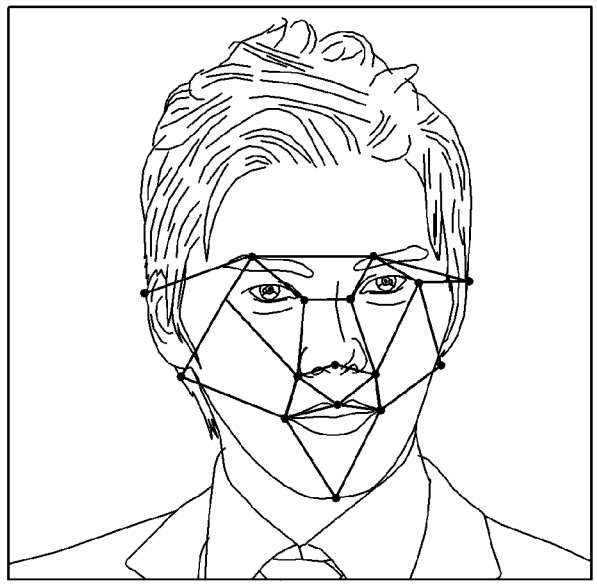
FIGS. 6A and 6B are views illustrating an example of a subject that can be sensed by a ToF sensor according to various embodiments of the present disclosure in a safety mode.
Figure 6B:
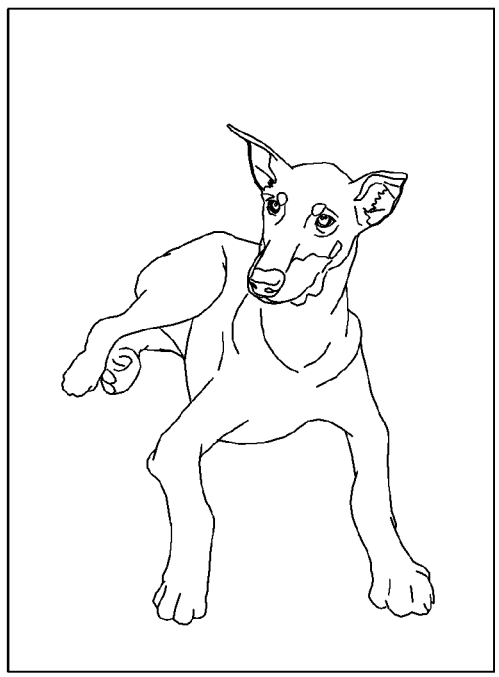

FIGS. 6A and 6B are views illustrating an example of a subject that can be sensed by a ToF sensor according to various embodiments of the present disclosure in a safety mode. When the ToF sensor 220 is operated in the safety mode, the mobile terminal 200 may detect a shape of a person, for example, a face outline including eyes or shadows as in FIG. 6A by using the ToF sensor 220. In addition, in the safety mode, a shape of an animal as in FIG. 6B can be detected.

When the subject is not determined as a person or an animal in the step S412 (S412: No), the controller 180 may determine to operate the ToF sensor 220 in a full power mode in the step S416. In the step S418, the controller 180 may create an image of the subject by using the ToF sensor 220 operating in the full power mode. In the step S418, the controller 180 may create an image of a subject (e.g., 3D image) by using the camera 121 and the ToF sensor 220.

Figure 7:
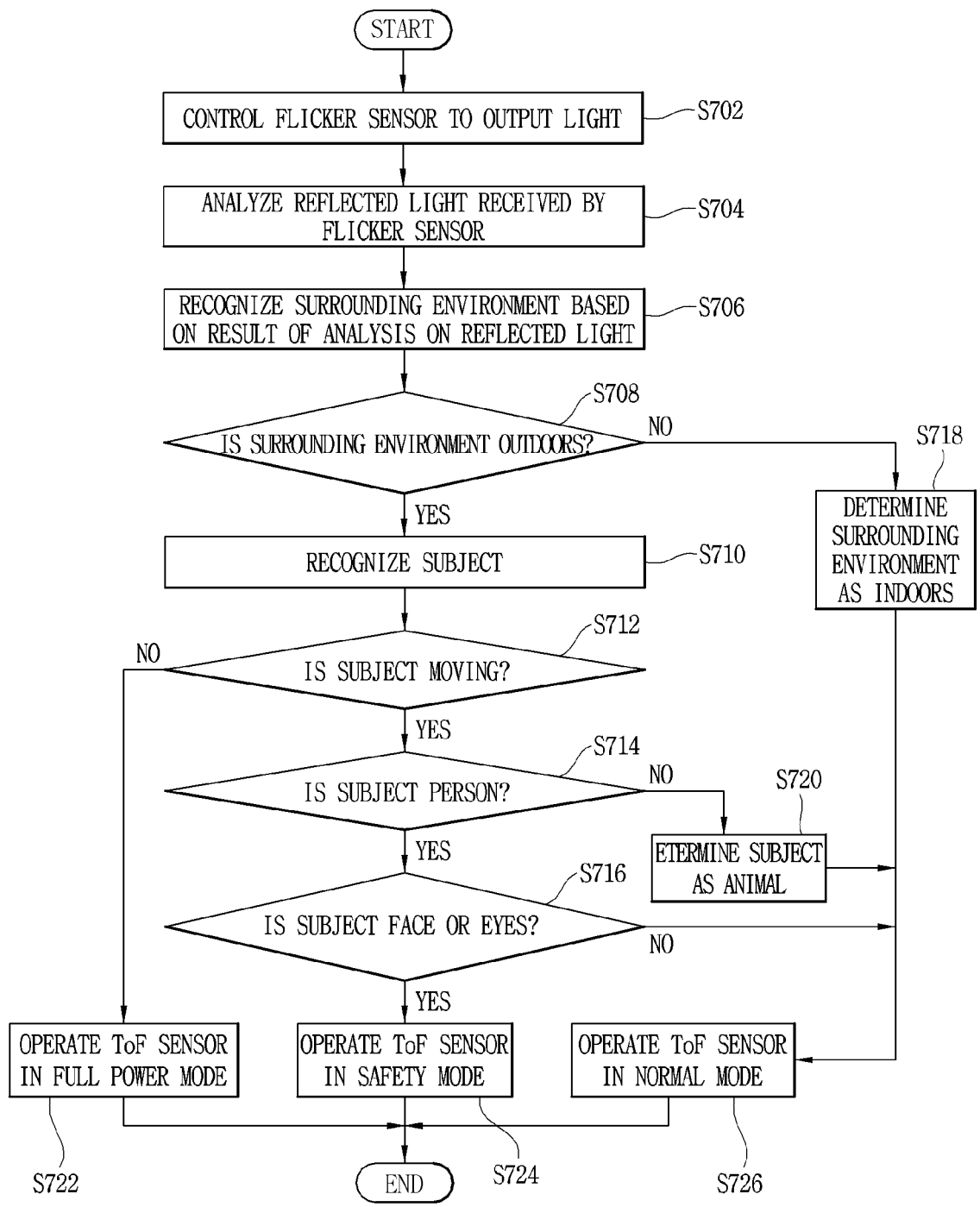
FIG. 7 is a flowchart illustrating a method for determining an operation mode of a ToF sensor according to various embodiments of the present disclosure.

FIG. 7 is a flowchart illustrating a method for determining an operation mode of a ToF sensor according to various embodiments of the present disclosure.

Referring to FIG. 7, the controller 180 of the mobile terminal 200 may control the flicker sensor 210 to output light in step S702. The controller 180 may analyze a reflected light received by the flicker sensor 210 in step S704. In step S706, the controller 180 may recognize the surrounding environment based on the result of the analysis on the reflected light in the step S704.

The controller 180 may determine whether the surrounding environment is outdoors in step S708. When the result of the determination in the step S708 is not outdoors (S708: No), that is, the surrounding environment is indoors, the controller 180 may operate the ToF sensor 220 in the normal mode in step S726.

When the result of the determination in the step S708 is outdoors (S708: Yes), the controller 180 may recognize a subject by using the camera 121 in the step S710. To recognize the subject, the controller 180 may use the camera 121 or a pyroelectric IR (PIR) sensor (not shown). The controller 180 may identify a subject by recognizing an object included in an image input through the lens of the camera 121. In addition, the controller 180 may identify the subject by sensing a thermal temperature of the subject or a change in the thermal temperature by using a PIR sensor.

In step S712, the controller 180 may determine whether the subject makes a movement, based on the result of the recognition of the subject in the step S710. When it is determined that the subject does not make a movement in the step S712 (S712: No), for example, the subject is an inanimate object or a plant, the controller 180 may operate the ToF sensor 220 in a full power mode in step S722.

When it is determined that the subject makes a movement in the step S712 (S712: Yes), the controller 180 may determine whether the subject is a person in step S714. When it is determined that the subject is not a person in the step S714 (S714: No), for example, the subject is an animal, the controller 180 may operate the ToF sensor 220 in a normal mode in the step S726.

When it is determined that the subject is a person in the step S714 (S714: Yes), the controller 180 may determine whether the subject is a face or eyes of a person in step S716. When it is determined that the subject is not a face or eyes of a person in the step S716 (S716: No), the controller 180 may operate the ToF sensor 220 in a normal mode in the step S726. When it is determined that the subject is a face or eyes of a person in the step S716 (S716: Yes), the controller 180 may operate the ToF sensor 220 in a safety mode in step S724.

Figure 8A:
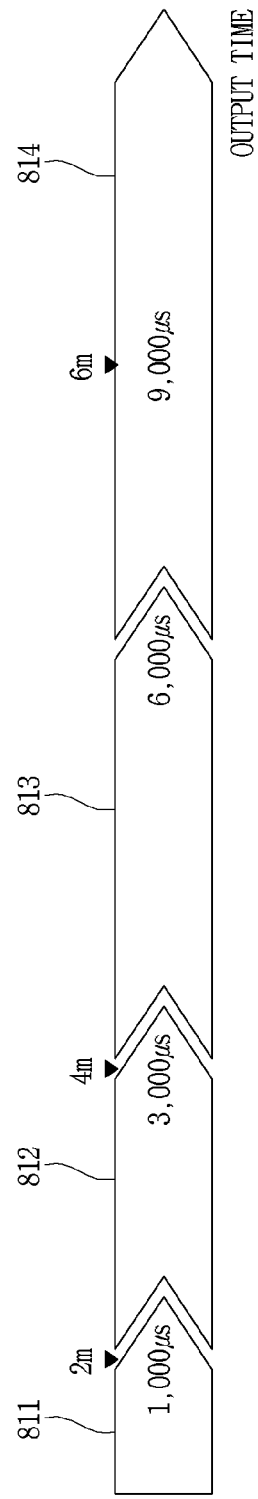
FIG. 8A is a view illustrating light output times from a VCSEL of a ToF sensor according to various embodiments of the present disclosure.
Figure 8B:
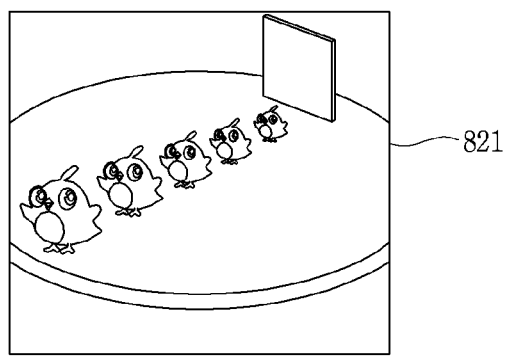
FIG. 8B is a view illustrating depth images generated for each light output time from a VCSEL.
Figure 8B:
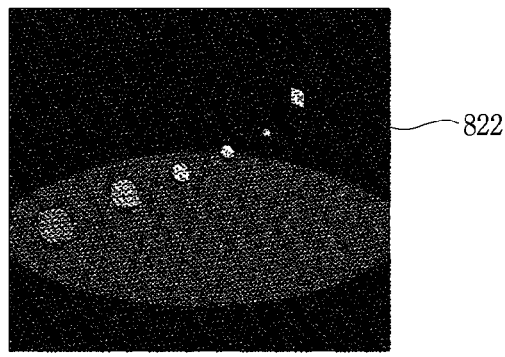
Figure 8B:
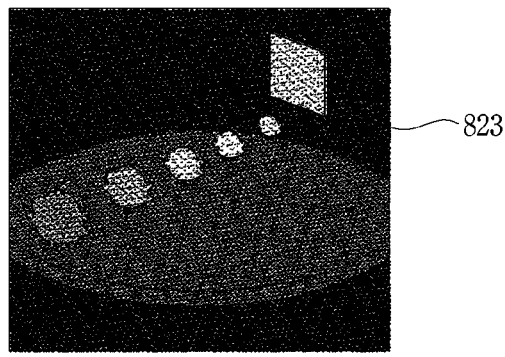
Figure 8B:
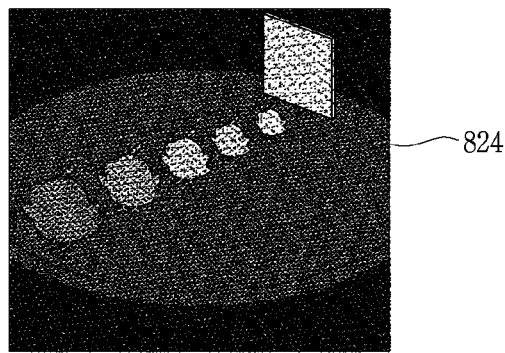

FIG. 8A is a view illustrating light output times from a VCSEL of a ToF sensor according to various embodiments of the present disclosure, and FIG. 8B is a view illustrating depth images generated for each light output time from a VCSEL. In FIGS. 8A and 8B, an intensity of light output through ToF sensor 220 (e.g., infrared light) is assumed to be constant.

Referring to FIG. 8A, a light output time from the ToF sensor 220, for example, a time during which light (e.g., infrared light) is output from the VCSEL may be divided into four sections. A first section 811 may be from 0 to 1000 µs, a second section 812 may be from 1000 µs to 3000 µs, a third section 813 may be from 3000 µs to 6000 µs, and a fourth section 814 may be 6000 µs or more. As a time for outputting light from the VCSEL becomes longer, the ToF sensor 220 may easily identify even a subject far from the mobile terminal 200. For example, when the time that light is output from the VCSEL is 1000 µs, the ToF sensor 220 can identify an object up to 2 m away from the mobile terminal 200. When the light output time from the VCSEL is 3000 µs, the ToF sensor 220 can identify an object up to 4 m away from the mobile terminal 200. And, when the light output time from the VCSEL is 9000 µs, the ToF sensor 220 can identify an object up to 6 m away from the mobile terminal 200.

FIG. 8B shows an original image 821 and depth images for each light output time of the ToF sensor 220. In FIG. 8B, a first depth image 822 is a depth image when the light output time of the ToF sensor 220 is 3000 μs, a second depth image 823 is a depth image when the light output time of the ToF sensor 220 is 6000 μs, and a third depth image 824 is a depth image when the light output time of the ToF sensor 220 is 9000 μs. As illustrated in FIG. 8B, as the light output time from the ToF sensor 220 gets longer, a distance in which the light is output from the ToF sensor 220 may be increased, and a recognition rate on a subject may also be increased. Accordingly, the mobile terminal 200 according to the present disclosure increases the recognition rate of the subject and obtains a depth image having a higher depth by adjusting the light output time from the ToF sensor 220.

Figure 9A:
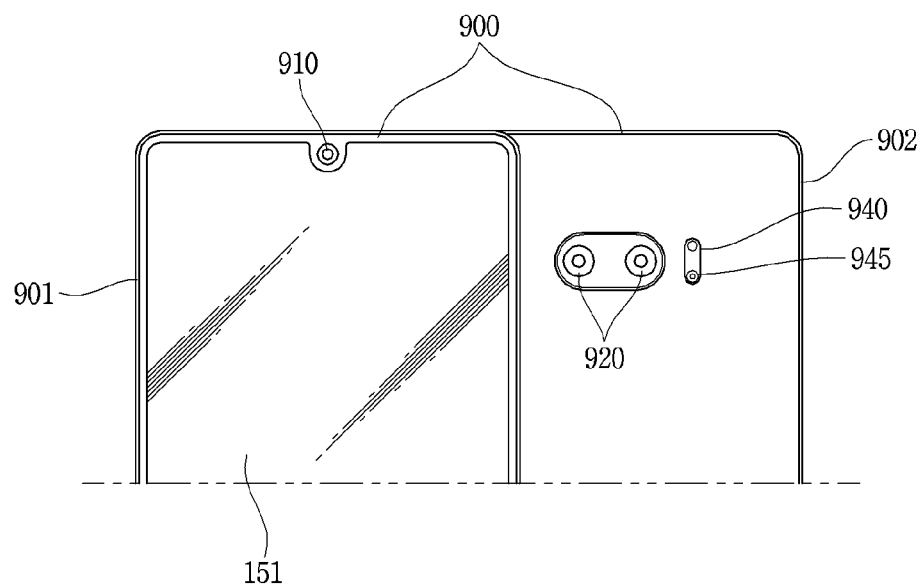
FIGS. 9A and 9B are views of front and rear surfaces of a mobile terminal according to various embodiments of the present disclosure.
Figure 9B:
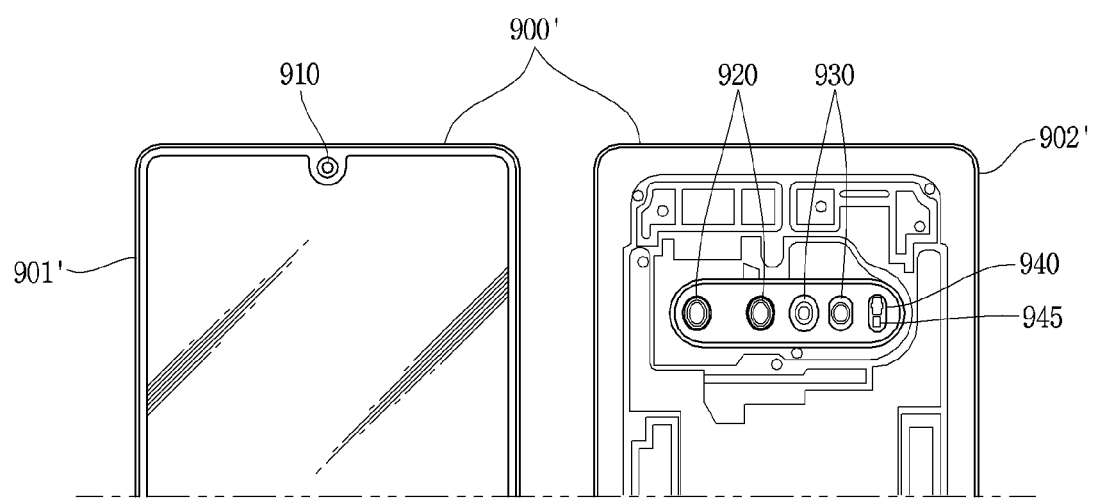

FIGS. 9A and 9B are views of front and rear surfaces of a mobile terminal according to various embodiments of the present disclosure.

Referring to FIG. 9A, a display 151 or a front camera 910 may be disposed on a front surface 901 of a mobile terminal 900, and a dual camera 920, a flash 940, or a flicker sensor 945 may be disposed on a rear surface 902 of the mobile terminal 900. Although a ToF sensor is not illustrated in the mobile terminal 900 in FIG. 9A, the ToF sensor may be disposed near the dual camera 920.

Referring to FIG. 9B, a display 151 or a front camera 910 may be disposed on a front surface 901' of a mobile terminal 900', and a dual camera 920, a ToF sensor 930, a flash 940, or a flicker sensor 945 may be disposed on a rear surface 902' of the mobile terminal 900'. According to one embodiment, the ToF sensor 930 may include at least one VCSEL, and may include an optical output module and an optical receiver.

Figure 10:
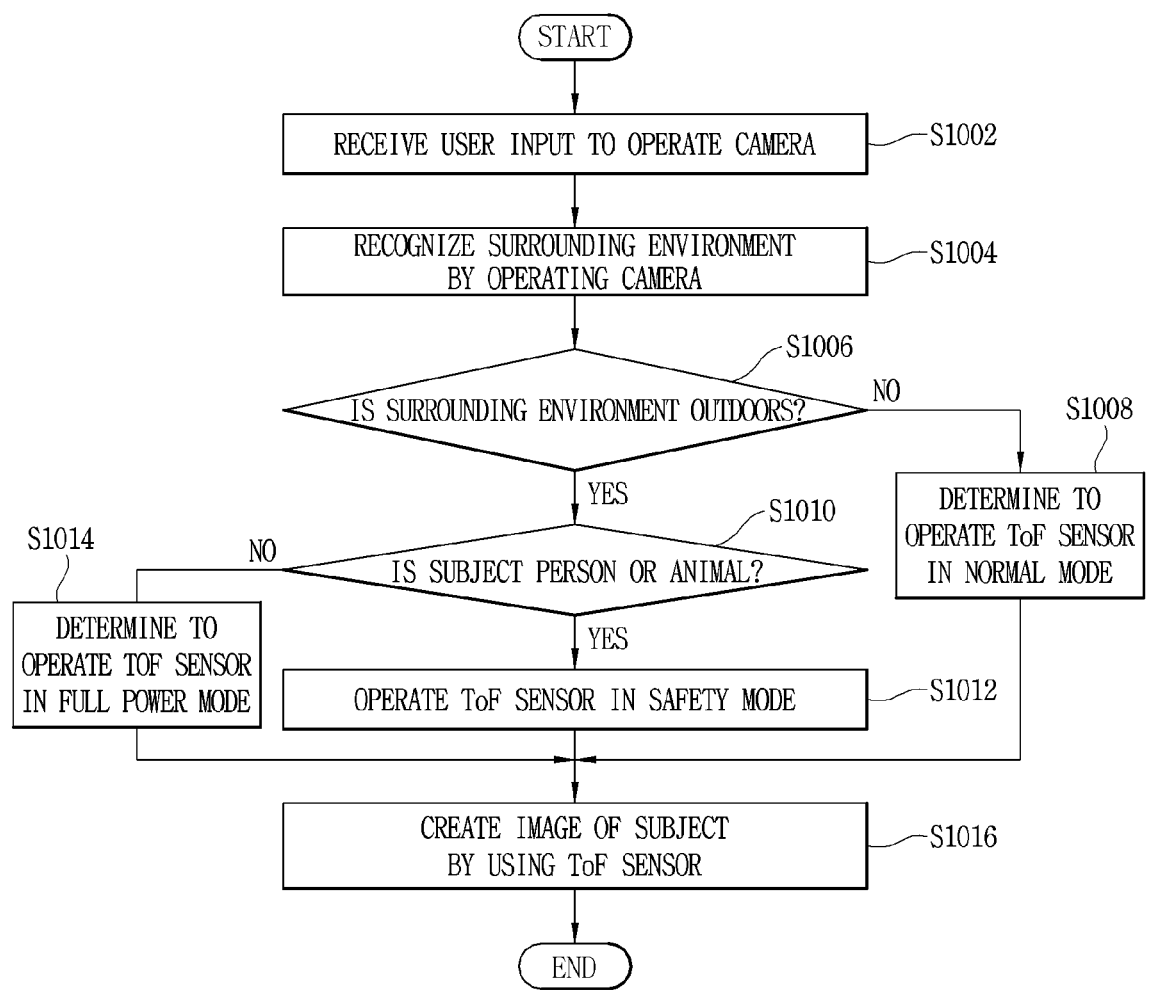
FIG. 10 is a flowchart illustrating a method of operating a mobile terminal according to various embodiments of the present disclosure.

FIG. 10 is a flowchart illustrating a method of operating a mobile terminal according to various embodiments of the present disclosure.

Referring to FIG. 10, the mobile terminal 200 may receive a user input to operate the camera 121 in step S1002. The user input may be inputted to the mobile terminal 200 through a UI or UX to operate the camera 121.

Upon receiving the user input, the controller 180 of the mobile terminal 200 may recognize the surrounding environment by operating the camera 121 in step S1004. The controller 180 may recognize the surrounding environment based on an image input through the lens of the camera 121.

In step S1006, the controller 180 may determine whether the surrounding environment is outdoors based on the result of the recognition of the surrounding environment in the step S1004. The controller 180 may determine a light output time of the ToF sensor 220 according to the result of the determination in the step S1006. The ToF sensor 220 may operate in a normal mode, a safety mode or a full power mode according to the light output time.

When the result of the determination in the step S1006 is not outdoors (S1006: No), the controller 180 may determine to operate the ToF sensor 220 in the normal mode in step S1008. In step S1016, the controller 180 may create an image of a subject by using the ToF sensor 220 operating in the normal mode.

When the result of the determination in the step S1006 is outdoors (S1006: Yes), the controller 180 may determine whether the subject included in the image inputted through the lens of the camera 121 is a person or an animal. When it is determined that the subject is a person or an animal in the step S1010 (S1010: Yes), the controller 180 may determine to operate the ToF sensor 220 in a safety mode in step S1012. In the step S1016, the controller 180 may create an image of the subject by using the ToF sensor 220 operating in the safety mode.

When it is determined that the subject is not a person and an animal in the step S1010 (S1010: No), the controller 180 may determine to operate the ToF sensor 220 in a full power mode in the step S1014. In the step S1016, the controller 180 may create an image of the subject by using the ToF sensor 220 operating in the full power mode.

FIGS. 11A to 11E are views illustrating an example of a camera 121 related UX using a ToF sensor according to various embodiments of the present disclosure.

Figure 11A:
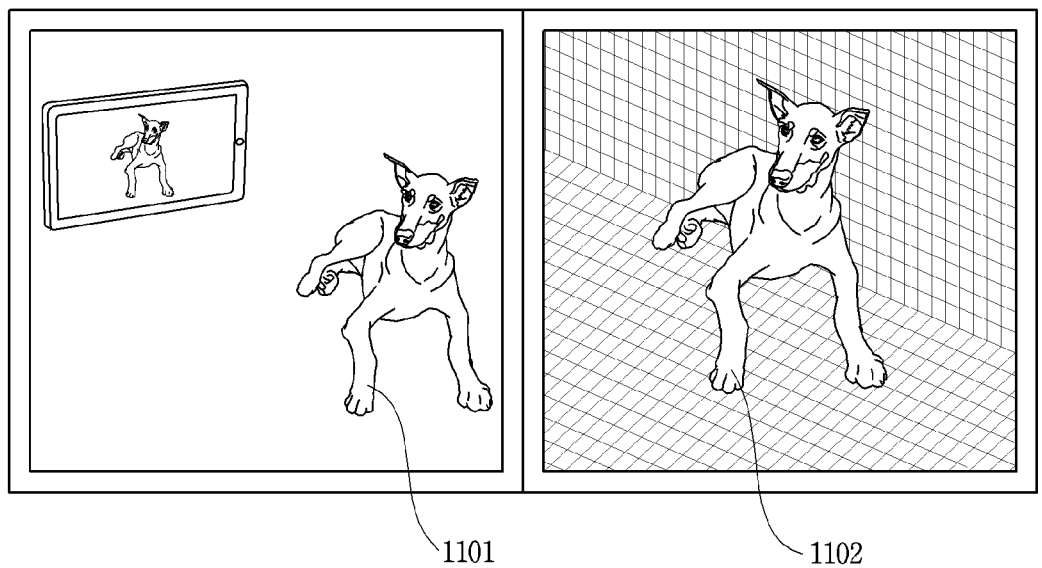
FIGS. 11A to 11E are views illustrating an example of a camera-related UX using a ToF sensor according to various embodiments of the present disclosure.

Referring to FIG. 11A, the mobile terminal 200 may capture a subject 1101 by using a camera 121 and a ToF sensor 220, create a 3D object 1102 for the subject 1101, and display the created 3D object on a display 151.

Figure 11B:
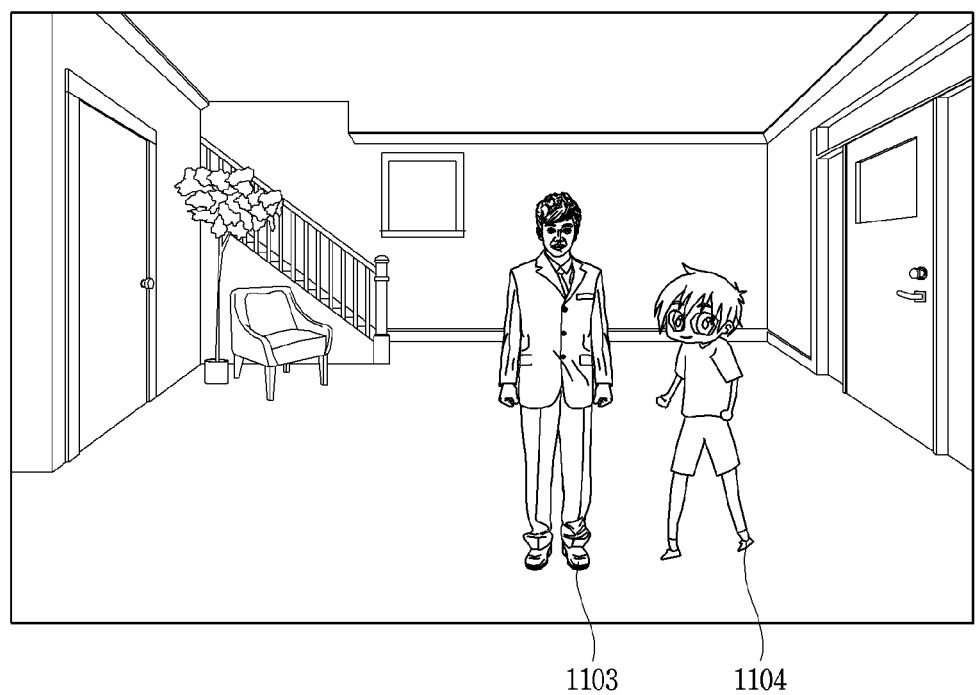

Referring to FIG. 11B, when a subject 1103 is a person or an animal, the mobile terminal 200 capturing the subject 1103 by using the camera 121 and the ToF sensor 220 may create a 3D avatar 1104 capable of following a motion of the subject 1103 in real time, and display the avatar on the display 151.

Figure 11C:
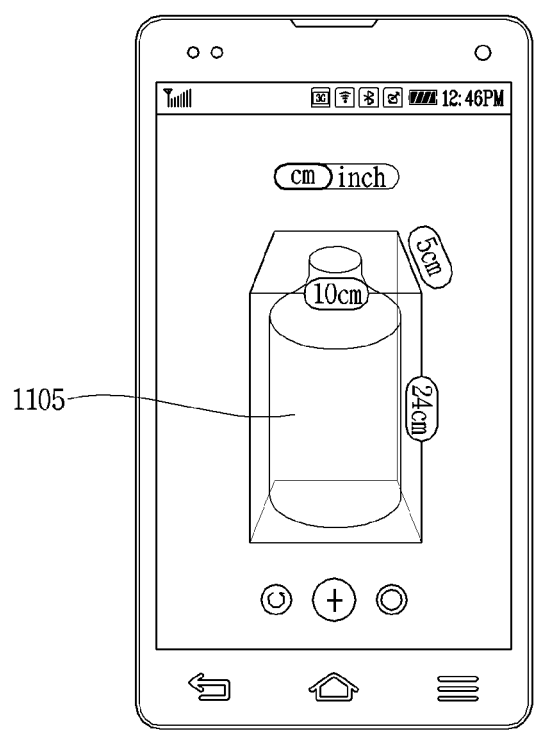

Referring to FIG. 11C, the mobile terminal 200 may capture a subject 1105 by using the camera 121 and the ToF sensor 220, and measure a length or area of the subject 1105 based on a depth measured by the ToF sensor 220, for example, a distance between the mobile terminal 200 and the subject 1105.

Figure 11D:
Figure 11E:
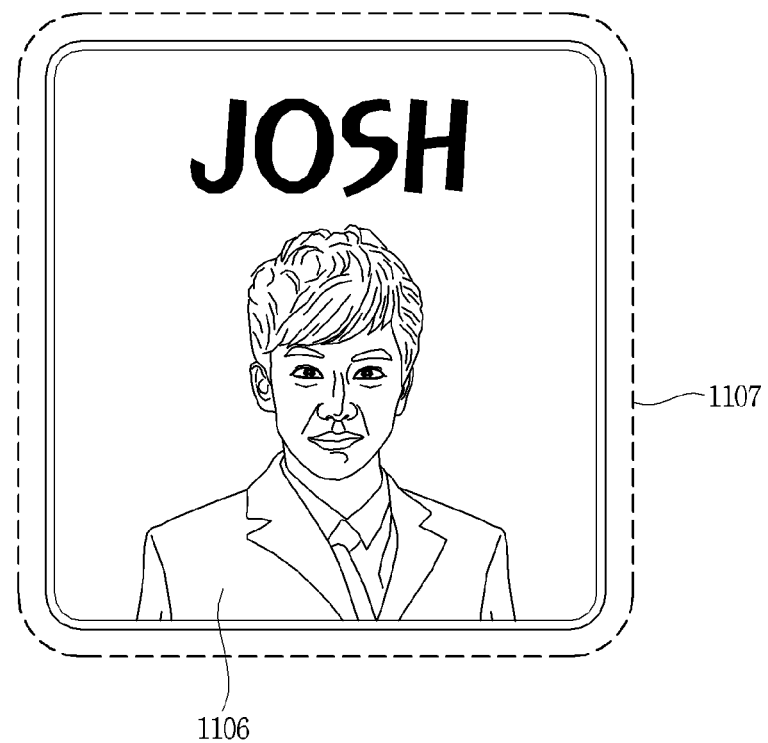

According to various embodiments, the mobile terminal 200 may take a picture or a video at a depth desired by a user, as illustrated in FIG. 11D. For example, the controller 180 may control the camera 121 to create a picture or video having a depth desired by the user by adjusting the light output time of the ToF sensor 220. In addition, the mobile terminal 200 captures a picture or a video by using the ToF sensor 220 and the camera 121, thereby applying an augmented reality (AR) effect 1107 on an image 1106 input in real time through the camera 121.

As used in various embodiments of the present specification, the term "module" may refer to, for example, a unit including one or a combination of two or more among a hardware, a software, or a firmware. The term "module" may be interchangeably used with terms such as, unit, logic, logical block, component, or circuit. The "module" may be a minimum unit of an integrally constructed component or a part thereof. The "module" may be a minimum unit performing one or more functions or a part thereof. The "module" may be implemented mechanically or electronically. For example, a "module" according to various embodiments of the present disclosure may include at least one among an application-specific integrated circuit (ASIC) chip, field-programmable gate arrays (FPGAs), or a programmable-logic device configured to perform operations, known or will be developed in the future.

At least a part of an apparatus (e.g., modules or functions thereof) or a method (e.g., operations) according to various embodiments of the present disclosure may be implemented by, for example, an instruction stored in a computer-readable storage medium in a form of a programming module. When executed by one or more processors (e.g., the controller 180), the one or more processors may perform a function corresponding to the instruction. The computer-readable storage medium (or recording medium) may be, for example, the memory 170. At least some of the programming modules may be implemented (e.g., executed) by, for example, the processor. At least some of the programming modules may include, for example, modules, programs, routines, sets of instructions, or processes to perform one or more functions. The computer-readable recording media may include: magnetic media such as a hard disks, a floppy disk, and a magnetic tape; optical media such as a compact disc read only memory (CD-ROM) and a digital versatile disc (DVD); magneto-optical media such as a floppy disk; and a hardware device configured to store and execute program instructions (e.g., programming module) such as a read only memory (ROM), a random access memory (RAM), a flash memory, etc. In addition, program instructions may include a high-level language code that can be executed by a computer using an interpreter or others as well as a machine code such as produced by a compiler. The hardware device described above may be configured to operate as one or more software modules to perform the operations of the various embodiments of the present disclosure, and vice versa.

Modules or programming modules according to various embodiments of the present disclosure may include at least one or more of the above components, some of which may be omitted, or may further include other additional components. Operations performed by modules, programming modules or other components according to various embodiments of the present disclosure may be executed in a sequential, parallel, repetitive, or heuristic manner. In addition, some operations may be executed in a different order or omitted, or other operations may be added.

According to various embodiments of the present disclosure, in a storage medium configured to store instructions, the instructions are set to allow at least one processor to perform at least one operation when the instructions are executed by the at least one processor (e.g., controller 180). The at least one operation may include: recognizing a surrounding environment by operating a flicker sensor in response to a user input for operating a camera; determining a light output time from a time of flight (ToF) sensor configured to measure a depth of a subject in response to the surrounding environment; and capturing the subject while measuring the depth of the subject by operating the ToF sensor in an operation mode corresponding to the light output time.

The present disclosure can be implemented as computer-readable codes in program-recorded media. The computer-readable media may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable media may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

What is claimed is:

1. A mobile terminal, comprising:
    a flicker sensor configured to recognize a surrounding environment of the mobile terminal;
    a time of flight (ToF) sensor configured to measure a depth of a subject and a camera configured to capture the subject to generate an image of the subject;
    a pyroelectric infrared (PIR) sensor configured to sense a temperature of the subject; and
    a controller configured to:
        in response to a user input for operating the camera, control the camera to recognize the surrounding environment by operating the flicker sensor;
        in response to the surrounding environment, determine a light output time of the ToF sensor; and
        capture the subject while measuring the depth of the subject by operating the ToF sensor in an operation mode corresponding to the light output time,
    wherein the controller is further configured to determine the operation mode of the ToF sensor according to whether the surrounding environment is outdoors,
    wherein the controller is further configured to:
        when the surrounding environment is outdoors, recognize the subject;
        determine whether the subject is a person or an animal; and
        when the subject is the person or the animal, determine to operate the ToF sensor in a safety mode or a normal mode, and
    wherein the controller is further configured to recognize the subject based on the temperature of the subject measured by the PIR sensor.

2. The mobile terminal of claim 1, wherein the controller is further configured to determine to operate the ToF sensor in the normal mode when the surrounding environment is not outdoors.

3. The mobile terminal of claim 1, wherein the controller is further configured to determine to operate the ToF sensor in a full power mode when the subject is not the person or the animal.

4. The mobile terminal of claim 1, wherein the controller is further configured to determine to operate the ToF sensor in the safety mode when the subject is a face or eyes of the person.

5. The mobile terminal of claim 1, wherein the controller is further configured to recognize the subject based on the image inputted through the camera.

6. A method for controlling a mobile terminal, the method comprising:
    in response to a user input for operating a camera, recognizing a surrounding environment by using a flicker sensor;
    in response to the surrounding environment, determining a light output time of a time of flight (ToF) sensor measuring a depth of a subject; and
    capturing the subject while measuring the depth of the subject by operating the ToF sensor in an operation mode corresponding to the light output time,
    wherein determining the light output time of the ToF sensor comprises determining the operation mode of the ToF sensor according to whether the surrounding environment is outdoors,
    wherein determining the operation mode of the ToF sensor comprises:
    recognizing the subject when the surrounding environment is outdoors;
    determining whether the subject is a person or an animal; and
    determining to operate the ToF sensor in a safety mode or a normal mode when the subject is the person or the animal, and
    wherein recognizing the subject when the surrounding environment is outdoors comprises measuring a temperature of the subject by operating a pyroelectric infrared (PIR) sensor to recognize the subject based on the temperature of the subject.

7. The method of claim 6, further comprising:
   determining to operate the ToF sensor in the normal mode when the surrounding environment is not outdoors.

8. The method of claim 6, further comprising:
   determining to operate the ToF sensor in a full power mode when the subject is not the person or the animal.

9. The method of claim 6, wherein determining to operate the ToF sensor in the safety mode or the normal mode comprises:
   determining to operate the ToF sensor in the safety mode when the subject is a face or eyes of the person.

10. The method of claim 6, wherein recognizing the subject when the surrounding environment is outdoors further comprises:
    recognizing the subject based on the image inputted through the camera.

* * * * *